United States Patent [19]

Ashby

[11] Patent Number: 4,718,134
[45] Date of Patent: Jan. 12, 1988

[54] END PLUG FOR BEE SHIPPING TUBES
[75] Inventor: Bryan H. Ashby, Beltsville, Md.
[73] Assignee: The United States of America as represented by the Secretary of Agriculture, Washington, D.C.
[21] Appl. No.: 858,809
[22] Filed: May 2, 1986
[51] Int. Cl.[4] .............................................. A01K 55/00
[52] U.S. Cl. .............................................. 6/9; 6/12 R
[58] Field of Search .................... 6/9, 12 R; 220/352, 220/380

[56] References Cited

U.S. PATENT DOCUMENTS

| 2,643,024 | 6/1953 | Cronheim | 220/367 |
| 3,104,681 | 9/1963 | Gray, Jr. | 220/352 X |
| 3,578,027 | 5/1971 | Zopfi | 220/352 X |
| 4,286,713 | 9/1981 | Marchais | 220/380 X |

FOREIGN PATENT DOCUMENTS 16470 of 1905 United Kingdom .................. 6/12 R

OTHER PUBLICATIONS

"The Badger Three Inch Plastic Core Plug", Badger Plug Co. Advertisement.

Primary Examiner—Robert P. Swiatek
Attorney, Agent, or Firm—M. Howard Silverstein

[57] ABSTRACT

A bee-shipping container comprising an elongated, hollow, imperforate-walled tube being open at both ends, a plug for each end, wherein each plug comprises a perforated disc having a thickness sufficient to substantially reduce visibility of the bees and prevent handlers from being stung through the disc, and at least one protruding member extending away from the disc and longitudinally beyond the outer extremity of the tube to butt against any external flat surface which inadvertently comes into contact with the plug, thereby to maintain direct communication between the disc and ambient air surrounding the tube whenever such contact is made.

17 Claims, 8 Drawing Figures

END PLUG FOR BEE SHIPPING TUBES

FIELD

The present invention relates to a device for shipping live bees.

PRIOR ART

Heretofore many honey bees have died during shipping due to lack of air, and antagonistic handling by cargo handlers (e.g., spraying with insecticide). To provide ventilation, ordinary wire or nylon screening has been employed at the open ends of imperforate fiberboard, cylindrical, hollow containers or tubes but the results have not been satisfactory because some bees have continued to die from lack of air. Furthermore, the bees are highly visibile through the screening to the cargo handlers, and handlers have been stung therethrough, both factors resulting in continued antagonistic handling.

SUMMARY

I have now developed a novel perforated end plug for such elongated imperforate-walled cylindrical containers or tubes which overcomes the above problems. The plug comprises a perforated disc which snugly fits in one of the open ends of the container, wherein the thickness of the disc is sufficient to prevent the bees in the container from stinging anyone handling the plugged ends of the containers, and further wherein such thickness is sufficient to substantially reduce visibility of the bees to the handlers; and at least one protruding member on the plug extending away from the disc and longitudinally beyond the outer extremity of the open end of the container to butt against any external flat surface which may inadvertently or otherwise come into contact with the plug, thereby to maintain the disc in direct communication with ambient air surrounding the container whenever the plug makes such contact.

Therefore it is an object of the present invention to provide a ventilated end plug through which honey bees can not sting anyone, and which will provide low visibility to handlers.

Another object is to provide an end plug which will continue to provide ventilation even though the plug may be thrust against an external flat surface such as a wall during transit of the bees.

A further object is to provide a ventilated plug that is not easily punctured.

A still further object is to provide a plug which increases the impact strength of the bee container.

Other objects and advantages will be obvious from the following detailed description and drawings in which.

DETAILED DESCRIPTION

Figure 1:
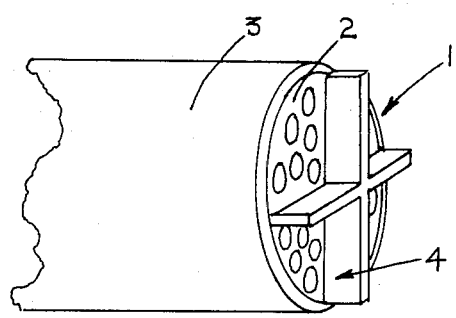
FIG. 1 is a perspective end view of the present invention.
Figure 2:
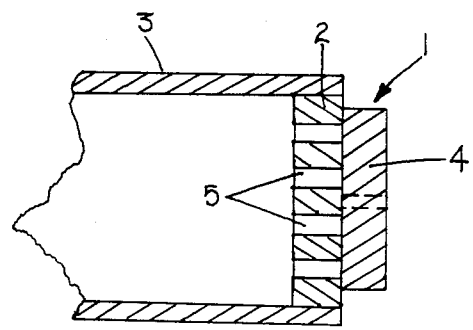
FIG. 2 is a cross-sectional side view of FIG. 1.

As shown in FIGS. 1 and 2, each plug 1 of the present invention, all components of which are integrally connected to one another, generally comprises a perforated disc 2, and a protruding member or members 4 which extend away from the disc and longitudinally beyond the outer extremity of the open end of imperforate-walled container 3. Members 4 prevent the disc from being sealed off from ambient air surrounding container 3 whenever plug 1 contacts or rests against external flat surfaces.

The diameter of the disc is about the same as the inner diameter of the container thereby providing for a snug fit between plug and container. The plug may be secured to the container by staples, screws, or other conventional attaching devices, not shown, extending through the wall of the container.

While only one open end of container 3 is illustrated, it should be understood that the container ordinarily includes a plug at each open end thereof.

The imperforate-walled container 3 typically is made of fiberboard but other materials of construction may be used such as plastic or metal. The plugs 1 preferably are constructed of plastic such as polyethylene or polypropylene.

Typical container dimensions are about 6" diameter by about 20" length, or 8" diameter by 14" length, which will hold one queen and about 2¼ pounds of honey bees.

The thickness of disc 2 is sufficient to prevent the bees in the container from stinging anyone handling or gripping the disc. In addition, such thickness is sufficient to substantially obscure viewing of the bees by handlers to thereby reduce antagonistic acts against the bees. A thickness of at least about ¼ inch in most instances will provide the requisite sting-free and low visibility environment, and further provides a plug that is not easily punctured.

Each individual perforation 5 in disc 2 may be round, square or other geometric configuration in cross-section, and obviously is small enough to prevent the egress of the occupants of the container. Square holes of about ⅛" by ⅛" are suitable. The distance between perforations should be adequate to maximize air circulation through the container and yet maintain appropriate strength for the disc to resist damage caused by external objects inadvertently coming into contact with the disc during handling or transit. In most instances a distance of about 1/32 to 1/16 inch between perforations will be suitable.

Figure 3:
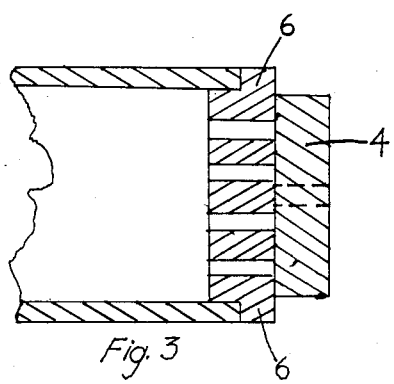
FIGS. 3 and 4 are cross-sectional side views of preferred embodiments.

As shown in FIG. 3, an outwardly flaring lip or flange 6 preferably is integrally connected to the outer end of the plug. The underside of the lip or flange butts against the outer extremity of the open end of the container, and thereby limits inward movement of the plug into the open end.

Figure 4:
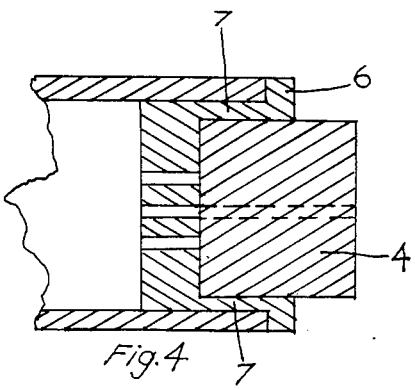

Another preferred embodiment is shown in FIG. 4, wherein the plug includes a cylindrical wall 7 which is perpendicular to and extends from the periphery of the disc 2. The outer diameter of the wall is about the same as the inner diameter of the container thereby providing for additional snug engagement between plug and container. The inclusion of wall 7 results in disc 2 being recessed in the opening. Such a recess further reduces visibility of the bees to handlers. Additionally, the recess enables the bees to be kept in a lower light environment thereby reducing shipping stress. Yet further, the combination of the disc 2 and wall 7 on plug 1 provides reinforcement for the container wall thereby imparting stacking and impact strength to the container. A recess distance of at least about 1 inch is preferred.

With further regard to FIG. 4, it can be seen that protruding members or fins 4 are connected to the inner surface of plug wall 7, thereby providing dimensional stability to the plug and additional reinforcement strength to the container.

Figure 5:
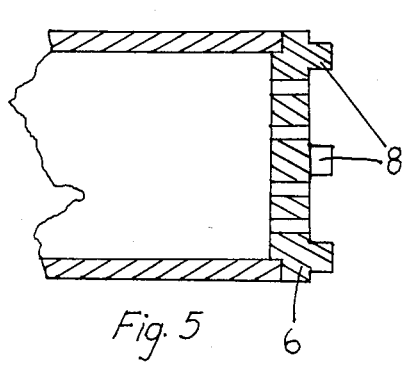
FIG. 5 is a cross-sectional side view of an alternative embodiment.

Referring now to FIG. 5, as an alternative to employing intersecting fins as the protruding member, a series of posts 8 may be provided along the flange 6 to maintain communication between the disc and ambient air whenever the plug is setting on end or resting against an external flat surface.

Figure 6:
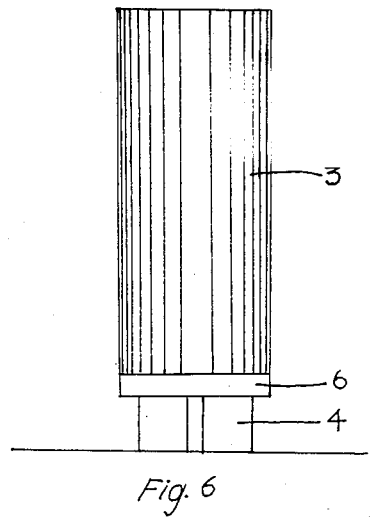
FIG. 6 illustrates the preferred apparatus in a vertical position.

With further regard to the protruding members 4 or 8, preferably there are a plurality of such members, as shown in the figures, and each member extends the same distance beyond the outer extremity of the container. In addition, it is preferred that the members are of sufficient number and size so that the elongated container may be stood, on a plugged end, in a stable position, as shown in FIG. 6. Thus, during filling of the apparatus, a first plug is inserted into an open end of the container, and thereafter the container is vertically stood on its plugged end, as shown in the figure, while bees are inserted into the as yet unplugged upper end of the container.

Figure 7:
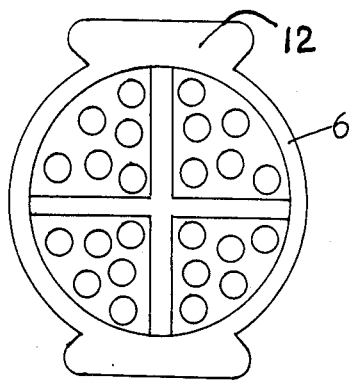
FIGS. 7 and 8 are end views of embodiments wherein the cylindrical container is prevented from rolling during handling and transit.
Figure 8:
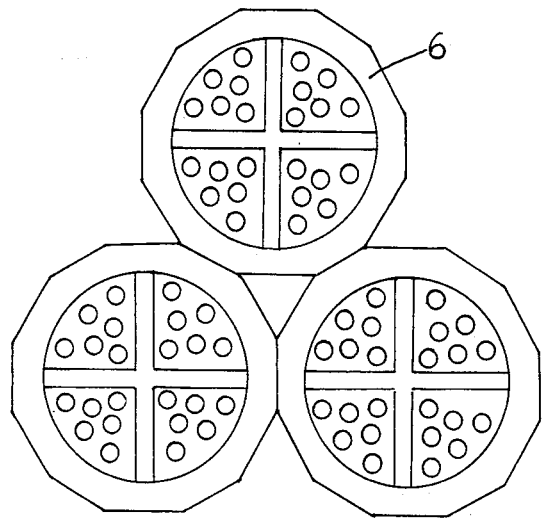

A further modification is shown in FIG. 7 wherein anti-roll tabs 12 are provided on flange 6 to prevent rolling of the container during handling and shipment, and thereby provide less stress for the bees. The anti-roll tabs also may be used as leverage devices to facilitate the removal of the plug from the cylindrical container. Alternatively, the peripheral shape of the flange may be in the form of a polygon, as shown in FIG. 8, to permit honeycomb-like stacking of the containers.

I claim:

1. An apparatus for shipping bees comprising an elongated cylindrical container having an imperforate wall and being open at both ends, a removable end plug for each of said ends, wherein each plug comprises
   (a) a perforated disc which snugly fits in one of said open ends, wherein the thickness of said disc is sufficient to prevent bees in said container from stinging anyone handling said plug; wherein said thickness further is sufficient to substantially reduce visibility of said bees to anyone handling said container; and
   (b) at least one protruding member on said plug extending away from said disc and longitudinally beyond the outer extremity of said one open end to butt against any external flat surface which may come into contact with said plug, thereby to maintain direct communication between said disc and ambient air surrounding said container whenever said plug makes such contact.

2. The apparatus of claim 1 wherein said disc is recessed into said one open end.

3. The apparatus of claim 2 wherein said plug includes an outwardly flaring flange at its outer end which limits inward movement of said plug into said one open end of said container.

4. The apparatus of claim 3 wherein there are a plurality of said protruding members on said plug, each of which extends the same distance beyond said outer extremity, wherein said members are of sufficient size and number so that said apparatus may be stood, on end, in a stable position.

5. The apparatus of claim 4 wherein said plug includes anti-roll tabs connected to said flange to prevent rolling of said container during handling and shipping.

6. The apparatus of claim 5 wherein said flange is polygonally-shaped to permit stacking of a plurality of said containers in a honeycomb-like pattern.

7. The apparatus of claim 5 wherein said plug includes a cylindrical wall perpendicular to and extending from said disc at its periphery, wherein said cylindrical wall snugly fits in said one open end.

8. The apparatus of claim 7 wherein said disc is recessed at least about 1 inch into said one open end.

9. The apparatus of claim 8 wherein said thickness of said disc is at least about ¼ inch.

10. The apparatus of claim 5 wherein said disc is recessed at least about 1 inch into said one open end.

11. The apparatus of claim 10 wherein said thickness of said disc is at least about ¼ inch.

12. The apparatus of claim 4 wherein said disc is recessed at least about 1 inch into said one open end.

13. The apparatus of claim 12 wherein said thickness of said disc is at least about ¼ inch.

14. The apparatus of claim 3 wherein said disc is recessed at least about 1 inch into said one open end.

15. The apparatus of claim 14 wherein said thickness of said disc is at least about ¼ inch.

16. The apparatus of claim 2 wherein said disc is recessed at least about 1 inch into said one open end.

17. The apparatus of claim 16 wherein said thickness of said disc is at least about ¼ inch.

* * * * *